(12) United States Patent
Fukao et al.

(10) Patent No.: US 10,012,297 B2
(45) Date of Patent: Jul. 3, 2018

(54) POWER TRANSMISSION SYSTEM

(71) Applicant: TOYOTA JIDOSHA KABUSHIKI KAISHA, Toyota-shi, Aichi-ken (JP)

(72) Inventors: Mitsuhiro Fukao, Toyota (JP); Hiroki Kondo, Miyoshi (JP); Akira Hino, Toyota (JP); Kazuya Sakamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 15/130,057

(22) Filed: Apr. 15, 2016

(65) Prior Publication Data
US 2016/0305522 A1 Oct. 20, 2016

(30) Foreign Application Priority Data
Apr. 17, 2015 (JP) .................................. 2015-085482

(51) Int. Cl.
*F16H 37/02* (2006.01)
*F16H 37/08* (2006.01)
(Continued)

(52) U.S. Cl.
CPC ......... *F16H 37/0846* (2013.01); *B60K 17/00* (2013.01); *B60K 17/16* (2013.01); *F16H 37/022* (2013.01); *F16H 61/0204* (2013.01); *F16H 61/12* (2013.01); *F16H 61/662* (2013.01); *F16H 2037/026* (2013.01);
(Continued)

(58) Field of Classification Search
CPC ............... F16H 37/022; F16H 37/0846; F16H 61/0204; F16H 61/12; F16H 2061/1204; F16H 2061/1208; F16H 2061/1252
See application file for complete search history.

(56) References Cited

U.S. PATENT DOCUMENTS

2005/0137043 A1* 6/2005 Kinugasa ............. F15B 20/008
475/5
2010/0255942 A1* 10/2010 Ogata .................... F16H 61/12
474/18

(Continued)

FOREIGN PATENT DOCUMENTS

WO 2013/176208 A1 11/2013

*Primary Examiner* — Edwin A Young
(74) *Attorney, Agent, or Firm* — Oliff PLC

(57) ABSTRACT

A power transmission system includes a first transmission provided in a first power transmission path, a second transmission provided in a second power transmission path, a first engagement device, a second engagement device, a third engagement device, a fail-safe valve, and an electronic control unit. The third engagement device selectively connects or interrupts one of the first and second power transmission paths. The electronic control unit is configured to, during traveling in a state where the third engagement device is released, output hydraulic pressure commands for simultaneous engagement of the first engagement device and the second engagement device. The electronic control unit is configured to, when it is determined that both the first engagement device and the second engagement device are engaged, prohibit traveling using the one of the first and second power transmission paths which is selectively connected or interrupted by the third engagement device.

3 Claims, 9 Drawing Sheets

(51) Int. Cl.
  *B60K 17/00* (2006.01)
  *B60K 17/16* (2006.01)
  *F16H 61/02* (2006.01)
  *F16H 61/12* (2010.01)
  *F16H 61/662* (2006.01)

(52) U.S. Cl.
  CPC ............... *F16H 2061/1204* (2013.01); *F16H 2061/1208* (2013.01); *F16H 2061/1252* (2013.01); *F16H 2702/06* (2013.01)

(56) References Cited

U.S. PATENT DOCUMENTS

2013/0323017 A1* 12/2013 Mano ............... F16H 61/12
　　　　　　　　　　　　　　　　　　　　 415/5
2015/0087463 A1　 3/2015 Nakagawa et al.

* cited by examiner

POWER TRANSMISSION SYSTEM

INCORPORATION BY REFERENCE

The disclosure of Japanese Patent Application No. 2015-085482 filed on Apr. 17, 2015 including the specification, drawings and abstract is incorporated herein by reference in its entirety.

BACKGROUND

1. Technical Field

The disclosure relates to a power transmission system including two transmission units provided in parallel with each other in power transmission paths between a driving force source and a drive wheel.

2. Description of Related Art

A well known power transmission system includes two transmission units. The two transmission units are provided in parallel with each other in power transmission paths between an input rotating member and an output rotating member. Power of a driving force source is transmitted to the input rotating member. The output rotating member outputs the power to a drive wheel. This is, for example, a power transmission system for a vehicle, described in International Application Publication No. 2013/176208. International Application Publication No. 2013/176208 describes the power transmission system for a vehicle, including a power transmission path through a gear train and a power transmission path through a belt-type continuously variable transmission. The power transmission paths are provided in parallel with each other between an input shaft and an output shaft. A first clutch is provided in the power transmission path through the gear train. The first clutch transmits or interrupts the transmission of power. A second clutch is provided in the power transmission path through the continuously variable transmission. The second clutch transmits or interrupts the transmission of power.

SUMMARY

For the purpose of avoiding simultaneous engagement of two engagement devices that are respectively engaged by supplied hydraulic pressures (for example, simultaneous engagement of the first clutch and the second clutch in the power transmission system for a vehicle, described in International Application Publication No. 2013/176208), it is conceivable to provide a fail-safe valve for interrupting any one of oil passages through which hydraulic pressures are respectively supplied to the two engagement devices. If such a fail-safe valve does not operate normally during traveling because of some failures, there is a concern that a tie-up of the power transmission system will occur resulting from the fact that two power transmission paths are established at the same time. For this reason, it is desired to detect a failure of the fail-safe valve during traveling. In contrast, if it is intended to determine whether the fail-safe valve operates normally by respectively supplying hydraulic pressures to the two engagement devices during traveling, a tie-up of the power transmission system occurs when the fail-safe valve has a failure.

The embodiments provide a power transmission system that is able to detect a failure of a fail-safe valve during traveling while preventing occurrence of a tie-up of the power transmission system.

One aspect provides a power transmission system configured to transmit power between an input rotating member to which power of a driving force source is transmitted and an output rotating member that outputs the power to a drive wheel of a vehicle. The power transmission system includes a first transmission, a second transmission, a first engagement device, a second engagement device, a third engagement device, a fail-safe valve, and an electronic control unit. The first transmission is provided in a first power transmission path between the input rotating member and the output rotating member. The second transmission is provided in parallel with the first transmission and in a second power transmission path between the input rotating member and the output rotating member. The first engagement device is configured to selectively connect or interrupt the first power transmission path that transmits power of the driving force source to the drive wheel via the first transmission unit. The second engagement device is configured to selectively connect or interrupt the second power transmission path that transmits power of the driving force source to the drive wheel via the second transmission unit. The third engagement device is configured to selectively connect or interrupt one of the first power transmission path and the second power transmission path. The fail-safe valve is configured to interrupt one of a first oil passage that supplies hydraulic pressure to the first engagement device and a second oil passage that supplies hydraulic pressure to the second engagement device such that simultaneous engagement of the first engagement device and the second engagement device is avoided. The electronic control unit is configured to, during traveling of the vehicle in a state where the third engagement device is released, (i) output hydraulic pressure commands for simultaneous engagement of the first engagement device and the second engagement device, (ii) determine whether both the first engagement device and the second engagement device are engaged at a time when the hydraulic pressure commands are being simultaneously output, and (iii) when it is determined that both the first engagement device and the second engagement device are engaged, prohibit traveling using the one of the first power transmission path and the second power transmission path which is selectively connected or interrupted by the third engagement device.

With this configuration, in a state where the third engagement device is released during traveling using the power transmission path in which the third engagement device is not interposed, by outputting hydraulic pressure commands for simultaneous engagement of the first engagement device and the second engagement device and then determining whether both the first engagement device and the second engagement device are engaged, it is possible to determine whether the fail-safe valve has a failure or is operating normally. At this time, because the third engagement device is released, a tie-up of the power transmission system does not occur even when the first engagement device and the second engagement device are simultaneously engaged. When it is determined that the fail-safe valve has a failure, traveling using the power transmission path, which is established by engaging the third engagement device and which causes a tie-up in the event of such a failure that the first engagement device and the second engagement device are simultaneously engaged, is prohibited. Thus, it is possible to detect a failure of the fail-safe valve during traveling while preventing occurrence of a tie-up of the power transmission system.

In the power transmission system according to the above aspect, the first transmission may be a gear transmission. The second transmission may be a continuously variable transmission. The first engagement device may be a first friction clutch. The second engagement device may be a second friction clutch. The third engagement device may be a dog clutch that is provided on the output rotating member side with respect to the first friction clutch and that selectively connects or interrupts the first power transmission path. The fail-safe valve may be configured to interrupt the first oil passage such that the simultaneous engagement is avoided. The electronic control unit may be configured to, during traveling using the second power transmission path established by engaging the second friction clutch in a state where the dog clutch is released, (i) output a hydraulic pressure command for engaging the first friction clutch, (ii) determine whether both the first friction clutch and the second friction clutch are engaged in response to the hydraulic pressure command, and (iii) when it is determined that both the first friction clutch and the second friction clutch are engaged, prohibit traveling using the first power transmission path. With this configuration, in a state where the dog clutch is released during traveling using the second power transmission path, by outputting a hydraulic pressure command for engaging the first friction clutch and determining whether both the first friction clutch and the second friction clutch are engaged, it is possible to determine whether the fail-safe valve has a failure or is operating normally. At this time, because the dog clutch is released, a tie-up of the power transmission system does not occur even when the first friction clutch is engaged. When it is determined that the fail-safe valve has a failure, traveling using the first power transmission path, which causes a tie-up in the event of such a failure that the second friction clutch is engaged, is prohibited.

In the power transmission system according to the above aspect, the first transmission may be a gear transmission. The second transmission may be a continuously variable transmission. The first engagement device may be a first friction clutch. The second engagement device may be a second friction clutch provided on the input rotating member side or the output rotating member side with respect to the continuously variable transmission unit. The third engagement device may be a third friction clutch that is provided on a rotating member side of the continuously variable transmission different from a side on which the second friction clutch is provided, and the third friction clutch may selectively connect or interrupt the second power transmission path. The fail-safe valve may be configured to interrupt the second oil passage such that the simultaneous engagement is avoided. The electronic control unit may be configured to, during traveling using the first power transmission path established by engaging the first friction clutch in a state where the third friction clutch is released, (i) output a hydraulic pressure command for engaging the second friction clutch, (ii) determine whether both the first friction clutch and the second friction clutch are engaged in response to the hydraulic pressure command, and (iii) when it is determined that both the first friction clutch and the second friction clutch are engaged, prohibit traveling using the second power transmission path. With this configuration, in a state where the third friction clutch is released during traveling using the first power transmission path, by outputting a hydraulic pressure command for engaging the second friction clutch and then determining whether both the first friction clutch and the second friction clutch are engaged, it is possible to determine whether the fail-safe valve has a failure or is operating normally. At this time, because the third friction clutch is released, a tie-up of the power transmission system does not occur even when the second friction clutch is engaged. When it is determined that the fail-safe valve has a failure, traveling using the second power transmission path, which causes a tie-up in the event of such a failure that the first friction clutch is engaged, is prohibited.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a first embodiment will be described in detail with reference to the accompanying drawings.

Figure 1:
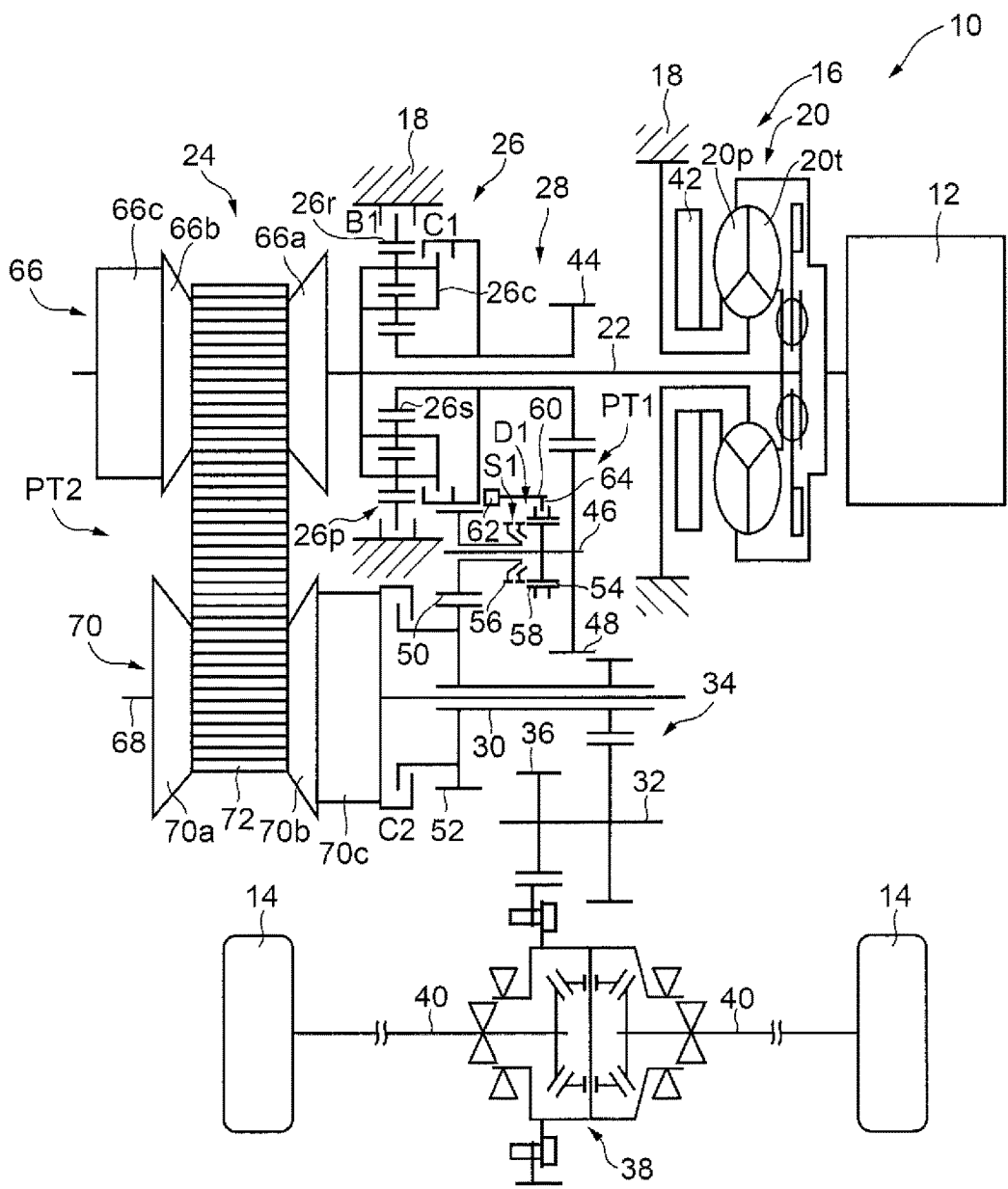
FIG. 1 is a view that illustrates the schematic configuration of a vehicle to which embodiments are applied.

FIG. 1 is a view that illustrates the schematic configuration of a vehicle 10 to which embodiments are applied. As shown in FIG. 1, the vehicle 10 includes an engine 12, drive wheels 14 and a power transmission system 16. The engine 12 functions as a driving force source for propelling the vehicle 10. The engine 12 is, for example, a gasoline engine or a diesel engine. The power transmission system 16 is provided between the engine 12 and the drive wheels 14.

The power transmission system 16 includes a known torque converter 20, an input shaft 22, a known belt-type continuously variable transmission 24 (hereinafter, referred to as continuously variable transmission 24), a forward/reverse switching device 26, a gear transmission mechanism 28, an output shaft 30, a counter shaft 32, a reduction gear unit 34, a differential gear 38, a pair of axles 40, and the like. The torque converter 20 serves as a fluid transmission device coupled to the engine 12 in a housing 18 that serves as a non-rotating member. The input shaft 22 is coupled to the torque converter 20. The continuously variable transmission 24 is coupled to the input shaft 22. The continuously variable transmission 24 serves as a continuously variable transmission unit. The forward/reverse switching device 26 is also coupled to the input shaft 22. The gear transmission mechanism 28 is coupled to the input shaft 22 via the forward/reverse switching device 26. The gear transmission mechanism 28 is provided in parallel with the continuously variable transmission 24. The gear transmission mechanism 28 serves as a gear transmission unit. The output shaft 30 is an output rotating member common to the continuously variable transmission 24 and the gear transmission mechanism 28. The reduction gear unit 34 is formed of a pair of gears. The pair of gears are respectively provided on the output shaft 30 and the counter shaft 32 so as to be relatively non-rotatable, and are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, the power of the engine 12 (when not specifically distinguished from one another, power is synonymous with torque and force) is transmitted to the pair of drive wheels 14 sequentially via the torque converter 20, the continuously variable transmission 24 (or the forward/reverse switching device 26 and the gear transmission mechanism 28), the reduction gear unit 34, the differential gear 38, the axles 40, and the like.

In this way, the power transmission system 16 includes the gear transmission mechanism 28 as a first transmission unit and the continuously variable transmission 24 as a second transmission unit. The gear transmission mechanism 28 and the continuously variable transmission 24 are provided in parallel with each other in power transmission paths between the engine 12 (which is synonymous with the input shaft 22 that is an input rotating member to which the power of the engine 12 is transmitted) and the drive wheels 14 (which are synonymous with the output shaft 30 that is an output rotating member that outputs the power of the engine 12 to the drive wheels 14). Thus, the power transmission system 16 includes a plurality of power transmission paths, that is, a first power transmission path PT1 and a second power transmission path PT2. The first power transmission path PT1 transmits the power of the engine 12 from the input shaft 22 to the drive wheels 14 side (that is, the output shaft 30) via the gear transmission mechanism 28. The second power transmission path PT2 transmits the power of the engine 12 from the input shaft 22 to the drive wheels 14 side (that is, the output shaft 30) via the continuously variable transmission 24. The power transmission system 16 is configured to change the power transmission path between the first power transmission path PT1 and the second power transmission path PT2 on the basis of a traveling state of the vehicle 10. Therefore, the power transmission system 16 includes a plurality of engagement devices that selectively change the power transmission path PT, which transmits the power of the engine 12 to the drive wheels 14 side, between the first power transmission path PT1 and the second power transmission path PT2. The engagement devices include a first clutch C1, a first brake B1 and a second clutch C2. The first clutch C1 and the first brake B1 serve as a first engagement device that connects or interrupts the first power transmission path PT1 (in other words, a first engagement device that establishes the first power transmission path PT1 when the first engagement device is engaged). The second clutch C2 serves as a second engagement device that connects or interrupts the second power transmission path PT2 (in other words, a second engagement device establishes the second power transmission path PT2 when the second engagement device is engaged). The first clutch C1, the first brake B1 and the second clutch C2 correspond to a separating device. Each of the first clutch C1, the first brake B1 and the second clutch C2 is a known hydraulic friction engagement device (friction clutch) that is frictionally engaged by a hydraulic actuator. The first clutch C1 and the first brake B1 correspond to a first friction clutch. The second clutch C2 corresponds to a second friction clutch. Each of the first clutch C1 and the first brake B1 is one of elements that constitute the forward/reverse switching device 26, as will be described later.

The torque converter 20 is provided around the input shaft 22 coaxially with the input shaft 22. The torque converter 20 includes a pump impeller 20p and a turbine runner 20t. The pump impeller 20p is coupled to the engine 12. The turbine runner 20t is coupled to the input shaft 22. A mechanical oil pump 42 is coupled to the pump impeller 20p. The oil pump 42 generates hydraulic pressure when driven by the engine 12 to rotate. The hydraulic pressure is used to control a shift of the continuously variable transmission 24, actuate the plurality of engagement devices or supply lubricating oil to portions of the power transmission system 16.

The forward/reverse switching device 26 is provided around the input shaft 22 coaxially with the input shaft 22 in the first power transmission path PT1. The forward/reverse switching device 26 includes a double-pinion-type planetary gear 26p, the first clutch C1 and the first brake B1. The planetary gear 26p is a differential mechanism including three rotating elements, that is, a carrier 26c, a sun gear 26s and a ring gear 26r. The carrier 26c serves as an input element. The sun gear 26s serves as an output element. The ring gear 26r serves as a reaction element. The carrier 26c is integrally coupled to the input shaft 22. The ring gear 26r is selectively coupled to the housing 18 via the first brake B1. The sun gear 26s is coupled to a small-diameter gear 44. The small-diameter gear 44 is provided around the input shaft 22 coaxially with the input shaft 22 so as to be relatively rotatable. The carrier 26c and the sun gear 26s are selectively coupled to each other via the first clutch C1. Thus, the first clutch C1 is the engagement device that selectively couples two of the three rotating elements to each other. The first brake B1 is the engagement device that selectively couples the reaction element to the housing 18.

The gear transmission mechanism 28 includes the small-diameter gear 44 and a large-diameter gear 48. The large-diameter gear 48 is provided around a gear mechanism counter shaft 46 coaxially with the gear mechanism counter shaft 46 so as to be relatively non-rotatable. The large-diameter gear 48 is in mesh with the small-diameter gear 44. The gear transmission mechanism 28 includes an idler gear 50 and an output gear 52. The idler gear 50 is provided around the gear mechanism counter shaft 46 coaxially with the gear mechanism counter shaft 46 so as to be relatively rotatable. The output gear 52 is provided around the output shaft 30 coaxially with the output shaft 30 so as to be relatively non-rotatable. The output gear 52 is in mesh with the idler gear 50. The output gear 52 has a larger diameter than the idler gear 50. Therefore, the gear transmission mechanism 28 has a speed ratio (speed stage) as a predetermined speed ratio (speed stage) in the power transmission path PT between the input shaft 22 and the output shaft 30. A dog clutch D1 is further provided around the gear mechanism counter shaft 46 between the large-diameter gear 48 and the idler gear 50. The dog clutch D1 selectively connects the large-diameter gear 48 to the idler gear 50 or disconnects the large-diameter gear 48 from the idler gear 50. The dog clutch D1 is provided in the power transmission system 16. The dog clutch D1 functions as a third engagement device that connects or interrupts the first power transmission path PT1 (a third engagement device that establishes the first power transmission path PT1 when the third engagement device is engaged together with the first friction clutch). The third engagement device is arranged in a power transmission path between the forward/reverse switching device 26 (which is synonymous with the first friction clutch) and the output shaft 30 (in other words, the third engagement device is provided on the output shaft 30 side with respect to the first friction clutch). The dog clutch D1 is included in the plurality of engagement devices.

Specifically, the dog clutch D1 includes a clutch hub 54, a clutch gear 56 and a cylindrical sleeve 58. The clutch hub 54 is provided around the gear mechanism counter shaft 46 coaxially with the gear mechanism counter shaft 46 so as to be relatively non-rotatable. The clutch gear 56 is arranged between the idler gear 50 and the clutch hub 54, and is fixed to the idler gear 50. The sleeve 58 is spline-fitted to the clutch hub 54. Thus, the sleeve 58 is provided so as to be relatively non-rotatable around the axis of the gear mechanism counter shaft 46 and relatively movable in a direction parallel to the axis. When the sleeve 58 that is constantly rotated integrally with the clutch hub 54 is moved toward the clutch gear 56 and is meshed with the clutch gear 56, the idler gear 50 and the gear mechanism counter shaft 46 are connected to each other. The dog clutch D1 includes a known synchromesh mechanism S1 that serves as a synchronization mechanism. The synchromesh mechanism S1 synchronizes rotations at the time of fitting the sleeve 58 to the clutch gear 56. In this way, in the dog clutch D1, when a fork shaft 60 is actuated by a hydraulic actuator 62, the sleeve 58 is caused to slide in the direction parallel to the axis of the gear mechanism counter shaft 46 via a shift fork 64 fixed to the fork shaft 60, and the engaged state and the released state are changed.

The first power transmission path PT1 is established when both the dog clutch D1 and the first clutch C1 (or the first brake B1) provided on the input shaft 22 side with respect to the dog clutch D1 are engaged. When the first clutch C1 is engaged, a forward power transmission path is established. When the first brake B1 is engaged, a reverse power transmission path is established. When the first power transmission path PT1 is established, the power transmission system 16 is set to a power transmittable state where the power of the engine 12 is allowed to be transmitted from the input shaft 22 to the output shaft 30 via the gear transmission mechanism 28. On the other hand, when at least both the first clutch C1 and the first brake B1 are released or at least the dog clutch D1 is released, the first power transmission path PT1 is set to a neutral state (power transmission interrupted state) where transmission of power is interrupted.

The continuously variable transmission 24 includes a primary pulley 66, a secondary pulley 70 and a transmission belt 72. The primary pulley 66 is provided on the input shaft 22, and has a variable effective diameter. The secondary pulley 70 is provided on a rotary shaft 68 coaxial with the output shaft 30, and has a variable effective diameter. The transmission belt 72 is wound around the pulleys 66, 70 so as to span between the pulleys 66, 70. Power is transmitted via a friction force (belt clamping force) between the pulleys 66, 70 and the transmission belt 72. In the primary pulley 66, a hydraulic pressure that is supplied to the primary pulley 66 (that is, a primary pressure Pin that is supplied to a primary-side hydraulic cylinder 66c) is regulated by a hydraulic control circuit 80 (see FIG. 3 and FIG. 4) that is driven by an electronic control unit 90 (see FIG. 3 and FIG. 4), with the result that a primary thrust Win (=Primary pressure Pin×Pressure receiving area) that changes the V-groove width between sheaves 66a, 66b is applied. In the secondary pulley 70, a hydraulic pressure that is supplied to the secondary pulley 70 (that is, a secondary pressure Pout that is supplied to a secondary-side hydraulic cylinder 70c) is regulated by the hydraulic control circuit 80, with the result that a secondary thrust Wout (=Secondary pressure Pout× Pressure receiving area) that changes the V-groove width between sheaves 70a, 70b is applied. In the continuously variable transmission 24, when the primary thrust Win (primary pressure Pin) and the secondary thrust Wout (secondary pressure Pout) each are controlled, the V-groove width of each of the pulleys 66, 70 changes, and the winding diameter (effective diameter) of the transmission belt 72 is changed. As a result, a speed ratio γcvt (=Primary pulley rotation speed Npri/Secondary pulley rotation speed Nsec) is changed, and a friction force between each of the pulleys 66, 70 and the transmission belt 72 is controlled such that no slip of the transmission belt 72 occurs.

The output shaft 30 is arranged around the rotary shaft 68 so as to be relatively rotatable coaxially with the rotary shaft 68. The second clutch C2 is provided on the drive wheels 14 (which are synonymous with the output shaft 30) side with respect to the continuously variable transmission 24 (that is, the second clutch C2 is provided between the secondary pulley 70 and the output shaft 30). The second clutch C2 selectively connects the secondary pulley 70 (rotary shaft 68) to the output shaft 30 or disconnects the secondary pulley 70 (rotary shaft 68) from the output shaft 30. The second power transmission path PT2 is established when the second clutch C2 is engaged. When the second power transmission path PT2 is established, the power transmission system 16 is set to a power transmittable state where the power of the engine 12 is allowed to be transmitted from the input shaft 22 to the output shaft 30 via the continuously variable transmission 24. On the other hand, the second power transmission path PT2 is set to a neutral state when the second clutch C2 is released.

Figure 2:
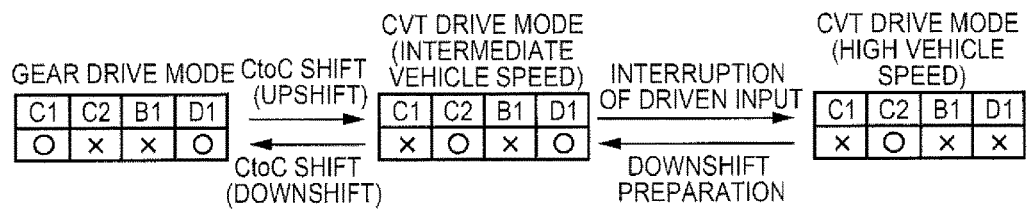
FIG. 2 is a view for illustrating changes in driving pattern of a power transmission system.

The operation of the power transmission system 16 will be described below. FIG. 2 is a view for illustrating changes in driving pattern (drive mode) of the power transmission system 16, which is changed by the electronic control unit 90, by using an engagement chart of the engagement devices for each driving pattern. In FIG. 2, C1 corresponds to the operation state of the first clutch C1, C2 corresponds to the operation state of the second clutch C2, B1 corresponds to the operation state of the first brake B1, D1 corresponds to the operation state of the dog clutch D1, "O" indicates an engaged (connected) state, and "x" indicates a released (disconnected) state.

In FIG. 2, in gear drive mode that is the driving pattern in which the power of the engine 12 is transmitted to the output shaft 30 via the gear transmission mechanism 28 (that is, via the first power transmission path PT1), the first clutch C1 and the dog clutch D1 are engaged, and the second clutch C2 and the first brake B1 are released. In the driving pattern of the gear drive mode, forward traveling is possible. In the driving pattern of the gear drive mode, in which the first brake B1 and the dog clutch D1 are engaged and the second clutch C2 and the first clutch C1 are released, reverse traveling is possible.

In CVT drive mode (belt drive mode, continuously variable shift mode) that is the driving pattern in which the power of the engine 12 is transmitted to the output shaft 30 via the continuously variable transmission 24 (that is, via the second power transmission path PT2), the second clutch C2 is engaged, and the first clutch C1 and the first brake B1 are released. In the driving pattern of the CVT drive mode, forward traveling is possible. Within the CVT drive mode, the dog clutch D1 is engaged in the driving pattern of the CVT drive mode (intermediate vehicle speed); whereas the dog clutch D1 is released in the driving pattern of the CVT drive mode (high vehicle speed). The reason why the dog clutch D1 is released in the CVT drive mode (high vehicle speed) is to, for example, eliminate a drag of the gear transmission mechanism 28, and the like, in the CVT drive mode and prevent high-speed rotation of the gear transmission mechanism 28, the constituent members (for example, pinion gears) of the planetary gear 26p, and the like, at a high vehicle speed. The dog clutch D1 functions as a driven input interrupting clutch that interrupts input from the drive wheels 14 side.

The gear drive mode is, for example, selected in a low vehicle speed region including a state during a stop of the vehicle. In the power transmission system 16, a speed ratio γgear that is established by the first power transmission path PT1 (that is, a speed ratio EL that is established by the gear transmission mechanism 28) is set to a value larger than (that is, a speed ratio lower than) the maximum speed ratio γmax that is established by the second power transmission path PT2 (that is, the lowest speed ratio that is the lowest vehicle speed-side speed ratio that is established by the continuously variable transmission 24). That is, the continuously variable transmission 24 establishes a speed ratio γcvt on the higher vehicle speed side (higher than) the speed ratio EL that is established by the gear transmission mechanism 28. For example, the speed ratio EL corresponds to a first-speed speed ratio γ1 that is the speed ratio γ of a first speed stage in the power transmission system 16, and the lowest speed ratio γ max of the continuously variable transmission 24 corresponds to a second-speed speed ratio γ2 that is the speed ratio γ of a second speed stage in the power transmission system 16. Therefore, for example, the gear drive mode and the CVT drive mode are changed in accordance with a shift line for changing the speed stage between the first speed stage and the second speed stage in a shift map of a known stepped transmission. In the CVT drive mode, a shift is carried out such that the speed ratio γ is changed on the basis of a traveling state, such as an accelerator operation amount and a vehicle speed, by using a known technique.

In changing the driving pattern from the gear drive mode to the CVT drive mode (high vehicle speed) or changing the driving pattern from the CVT drive mode (high vehicle speed) to the gear drive mode, the change is carried out via a CVT drive mode (intermediate vehicle speed) shown in FIG. 2. For example, when the driving pattern is changed from the gear drive mode to the CVT drive mode (high vehicle speed), the driving pattern is changed to the CVT drive mode (intermediate vehicle speed) by carrying out a shift for changing the engaged clutch (for example, clutch-to-clutch shift (hereinafter, referred to as CtoC shift)) so as to release the first clutch C1 and engage the second clutch C2. After that, the dog clutch D1 is released. For example, when the driving pattern is changed from the CVT drive mode (high vehicle speed) to the gear drive mode, the driving pattern is changed to the CVT drive mode (intermediate vehicle speed) by engaging the dog clutch D1 in preparation for changing the driving pattern to the gear drive mode. After that, a shift for changing the engaged clutch (for example, CtoC shift) is carried out so as to release the second clutch C2 and engage the first clutch C1.

Figure 3:
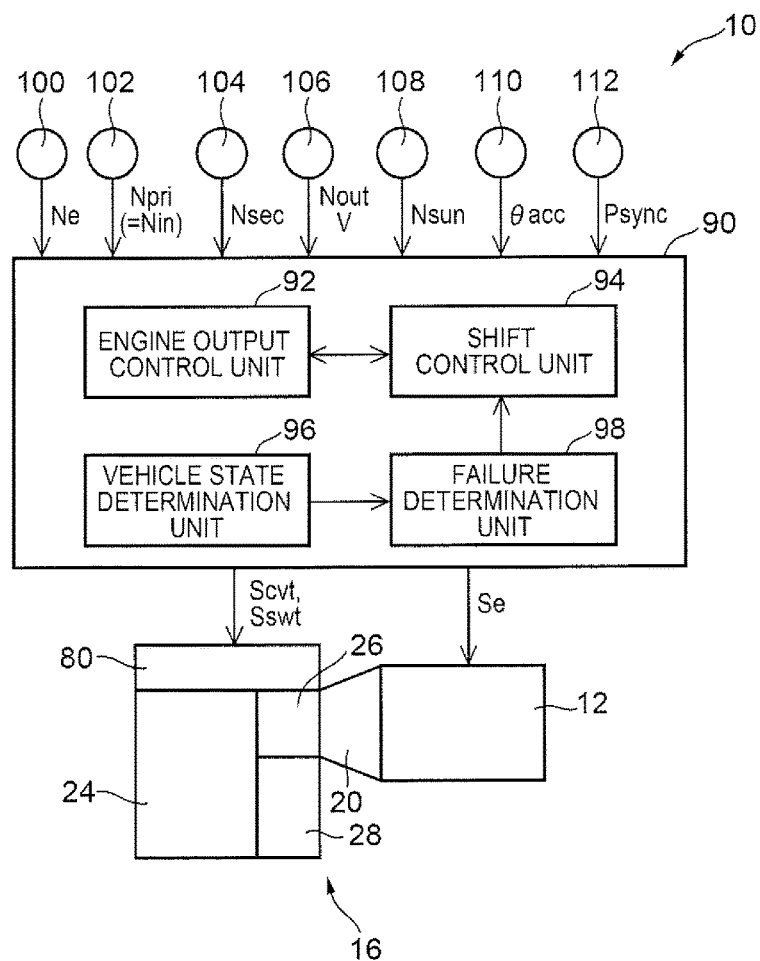
FIG. 3 is a view that illustrates a relevant portion of control functions and a control system for various controls in the vehicle.

FIG. 3 is a view that illustrates a relevant portion of control functions and control system for various controls in the vehicle 10. As shown in FIG. 3, the vehicle 10 includes, for example, an electronic control unit 90 including a control apparatus for the power transmission system 16. Thus, FIG. 3 is a view that shows input/output lines of the electronic control unit 90, and is a functional block diagram that illustrates a relevant portion of control functions implemented by the electronic control unit 90. The electronic control unit 90 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 90 is configured to execute output control over the engine 12, shift control over the continuously variable transmission 24, control for changing the driving pattern of the power transmission system 16, and the like. Where necessary, the electronic control unit 90 is split into an electronic control unit for controlling the engine, an electronic control unit for controlling hydraulic pressure, and the like.

Various actual values based on detection signals of various sensors of the vehicle 10 are supplied to the electronic control unit 90. The various sensors include, for example, various rotation speed sensors 100, 102, 104, 106, 108, an accelerator operation amount sensor 110, a stroke sensor 112, and the like. The various actual values include, for example, an engine rotation speed Ne, a primary pulley rotation speed Npri, a secondary pulley rotation speed Nsec, an output shaft rotation speed Nout, a sun gear rotation speed Nsun, an accelerator operation amount θacc, a synchromesh position Psync, and the like. The primary pulley rotation speed Npri is an input shaft rotation speed Nin. The secondary pulley rotation speed Nsec is the rotation speed of the rotary shaft 68. The output shaft rotation speed Nout corresponds to a vehicle speed V. The sun gear rotation speed Nsun is the rotation speed of the small-diameter gear 44. The synchromesh position Psync is a movement position of the shift fork 64 (or the fork shaft 60, or the like) corresponding to information about the position of the sleeve 58 between a releasing-side position of the sleeve 58 and an engaging-side position of the sleeve 58. At the releasing-side position of the sleeve 58, the dog clutch D1 is placed in a completely released state. At the engaging-side position of the sleeve 58, the dog clutch D1 is placed in a completely engaged state. An engine output control command signal Se, a hydraulic control command signal Scvt, a hydraulic control command signal Sswt, and the like, are output from the electronic control unit 90. The engine output control command signal Se is used to control the output of the engine 12. The hydraulic control command signal Scvt is used to control hydraulic pressure associated with a shift of the continuously variable transmission 24. The hydraulic control command signal Sswt is used to control the first clutch C1, the first brake B1, the second clutch C2 and the dog clutch D1 associated with a change of the driving pattern of the power transmission system 16. For example, command signals (hydraulic pressure commands) for respectively driving solenoid valves that control hydraulic pressures that are supplied to hydraulic actuators of the first clutch C1, the first brake B1, the second clutch C2 and the dog clutch D1 are output to the hydraulic control circuit 80 as the hydraulic control command signal Sswt.

Figure 4:
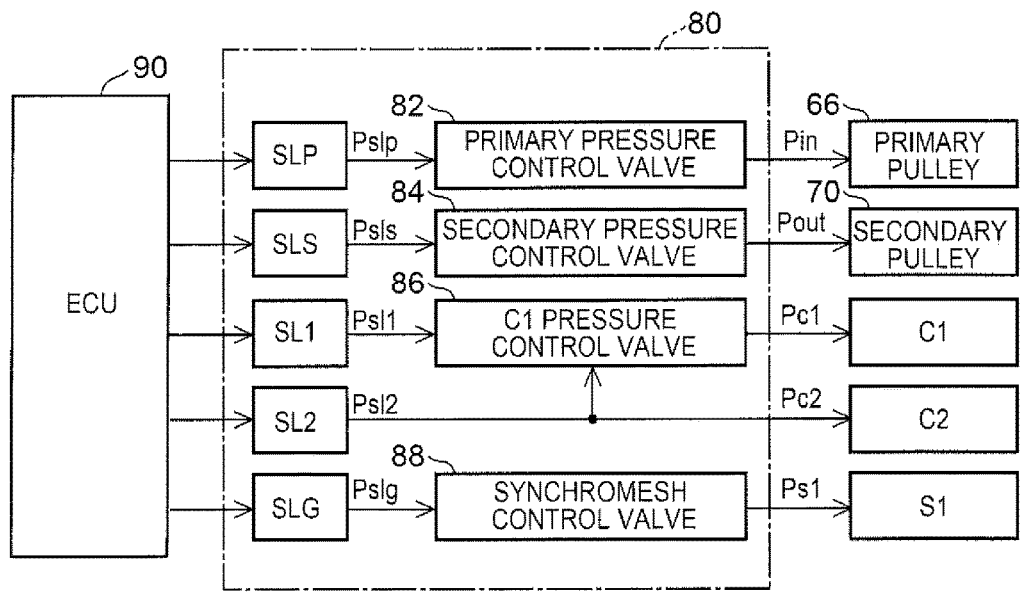
FIG. 4 is a view that illustrates portions of a hydraulic control circuit, which controls hydraulic pressures associated with a continuously variable transmission, a first clutch, a second clutch and a dog clutch.

FIG. 4 is a view that illustrates portions of the hydraulic control circuit 80 provided in the power transmission system 16, which control hydraulic pressures associated with the continuously variable transmission 24, the first clutch C1, the second clutch C2 and the dog clutch D1. The hydraulic control circuit 80 includes a primary electromagnetic valve SLP, a secondary electromagnetic valve SLS, a C1 electromagnetic valve SL1, a C2 electromagnetic valve SL2 and a synchromesh electromagnetic valve SLG. The primary electromagnetic valve SLP is used to control the primary pressure Pin that is supplied to the primary pulley 66. The secondary electromagnetic valve SLS is used to control the secondary pressure Pout that is supplied to the secondary pulley 70. The C1 electromagnetic valve SL1 is used to control a C1 pressure Pc1 that is supplied to the first clutch C1. The C2 electromagnetic valve SL2 is used to control a C2 pressure Pc2 that is supplied to the second clutch C2. The synchromesh electromagnetic valve SLG is used to control a synchromesh control pressure Ps1 that is supplied to the hydraulic actuator 62 for actuating the synchromesh mechanism S1. The hydraulic control circuit 80 includes a primary pressure control valve 82, a secondary pressure control valve 84, a C1 pressure control valve 86 and a synchromesh control valve 88.

The electromagnetic valves SLP, SLS, SL1, SL2, SLG each are a linear solenoid valve that is driven by a hydraulic control command signal (driving current) that is output from the electronic control unit 90. The primary pressure control valve 82 is actuated on the basis of an SLP pressure Pslp that is output from the primary electromagnetic valve SLP to regulate the primary pressure Pin. The secondary pressure control valve 84 is actuated on the basis of an SLS pressure Psls that is output from the secondary electromagnetic valve SLS to regulate the secondary pressure Pout. The synchromesh control valve 88 is actuated on the basis of an SLG pressure Pslg that is output from the synchromesh electromagnetic valve SLG to regulate the synchromesh control pressure Ps1. The C1 pressure control valve 86 switches between a communication state and interrupted state of an oil passage that supplies an SL1 pressure Psl1, which is output from the C1 electromagnetic valve SL1, to the first clutch C1 as the C1 pressure Pc1. The C1 pressure control valve 86 functions as a fail-safe valve that avoids simultaneous engagement of the first clutch C1 and the second clutch C2 by interrupting the oil passage that supplies the C1 pressure Pc1 (which is synonymous with the SL1 pressure Psl1) to the first clutch C1. An SL2 pressure Psl2 that is output from the C2 electromagnetic valve SL2 is directly supplied to the second clutch C2 as the C2 pressure Pc2.

Figure 5:
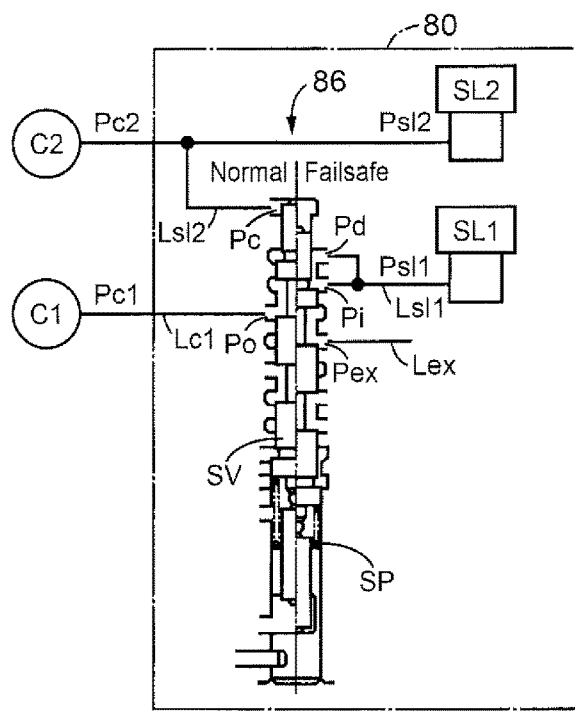
FIG. 5 is a view that illustrates the configuration of a C1 pressure control valve.

FIG. 5 is a view that illustrates the configuration of the C1 pressure control valve 86. In FIG. 5, the C1 pressure control valve 86 includes a spring SP, an input port Pi, a drain port Pex, an output port Po, a diameter difference port Pd and an oil chamber Pc. The output port Po alternatively communicates with the input port Pi or the drain port Pex. The C1 pressure control valve 86 is a well-known spool valve that includes a spool valve element SV accommodated in a valve body so as to be slidable by a predetermined movement stroke and urged by the spring SP in one direction and that communicates the input port Pi with the output port Po or communicates the drain port Pex with the output port Po as a result of movement of the spool valve element SV to one end or the other end of a sliding stroke. An oil passage Lsl1 to which the SL1 pressure Psl1 is supplied from the C1 electromagnetic valve SL1 is connected to the input port Pi and the diameter difference port Pd. A drain oil passage Lex is connected to the drain port Pex. An oil passage Lc1 that supplies the C1 pressure Pc1 is connected to the output port Po. An oil passage Lsl2 to which the SL2 pressure Psl2 is supplied from the C2 electromagnetic valve SL2 is connected to the oil chamber Pc. The thus configured C1 pressure control valve 86 alternately switches between a normal valve position (see Normal-side valve position in FIG. 5) and a fail-safe valve position (see Failsafe-side valve position in FIG. 5) on the basis of the SL1 pressure Psl1 and the SL2 pressure Psl2. In the normal valve position, the oil passage Lsl1 and the oil passage Lc1 are connected with each other. In the fail-safe valve position, the drain oil passage Lex and the oil passage Lc1 are connected with each other.

In the C1 pressure control valve 86, the spring SP generates urging force for keeping the spool valve element SV in the normal valve position (Normal). The SL1 pressure Psl1 and the SL2 pressure Psl2 generate thrust for switching the spool valve element SV to the fail-safe valve position (Failsafe) against the urging force of the spring SP. When the total hydraulic pressure of the SL1 pressure Psl1 and the SL2 pressure Psl2, which is higher than or equal to a predetermined pressure, is applied to the C1 pressure control valve 86, the C1 pressure control valve 86 is switched to the fail-safe valve position (Failsafe).

Figure 6:
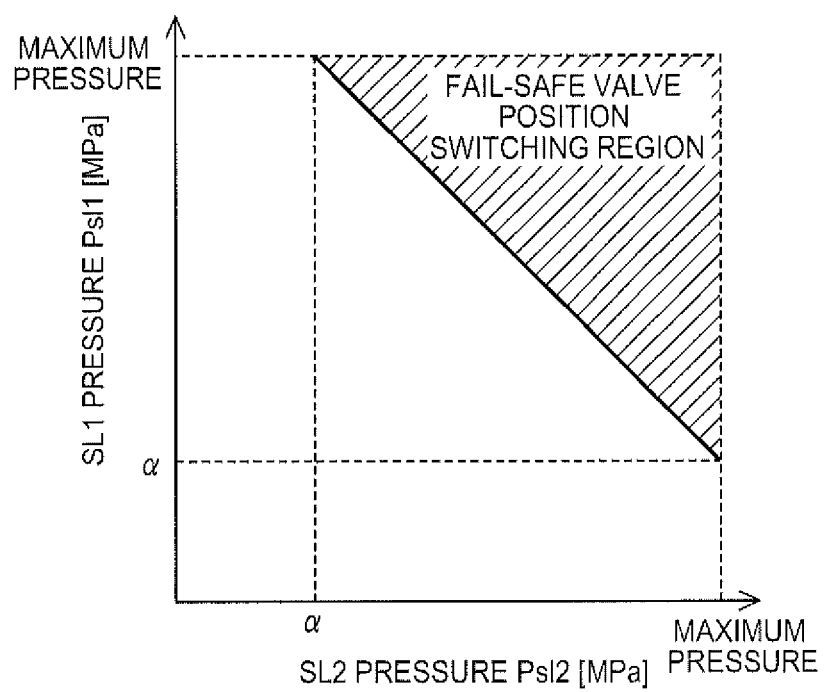
FIG. 6 is a graph that shows an example of an operation region in which the C1 pressure control valve is switched to a fail-safe valve position.

FIG. 6 is a graph that shows an example of an operation region (fail-safe valve position switching region) in which the C1 pressure control valve 86 is switched to the fail-safe valve position (Failsafe). In FIG. 6, the maximum pressure Psl1max of the C1 electromagnetic valve SL1 and the maximum pressure Psl2max of the C2 electromagnetic valve SL2 are the same value. When a hydraulic pressure that exceeds a hydraulic pressure obtained by adding a predetermined hydraulic pressure α to the maximum pressure Psl1max or a hydraulic pressure that exceeds a hydraulic pressure obtained by adding the predetermined hydraulic pressure α to the maximum pressure Psl2max is applied to the C1 pressure control valve 86, the C1 pressure control valve 86 is switched to the fail-safe valve position (Failsafe). That is, when the total hydraulic pressure of the SL1 pressure Psl1 and the SL2 pressure Psl2 exceeds the total hydraulic pressure of the maximum pressure Psl1max (or the maximum pressure Psl2max) and the predetermined hydraulic pressure α, the C1 pressure control valve 86 is switched to the fail-safe valve position (Failsafe). Therefore, for example, when the output of the SL1 pressure Psl1 for engaging the first clutch C1 and the output of the SL2 pressure Psl2 (for example, the maximum pressure Psl2max) due to a failure of the C2 electromagnetic valve SL2 coincide with each other, or when the output of the SL2 pressure Psl2 for engaging the second clutch C2 and the output of the SL1 pressure Psl1 (for example, the maximum pressure Psl1max) due to a failure of the C1 electromagnetic valve SL1 coincide with each other, the C1 pressure control valve 86 is switched to the fail-safe valve position (Failsafe). Thus, when the oil passage Lc1 is connected to the drain oil passage Lex (in other words, when the oil passage Lc1 that supplies the C1 pressure Pc1 is interrupted), the C1 pressure Pc1 (SL1 pressure Psl1) is not supplied to the first clutch C1, and the first clutch C1 is released, so the first power transmission path PT1 is set to the power transmission interrupted state. Thus, simultaneous engagement of the first clutch C1 and the second clutch C2 is avoided, so a tie-up of the power transmission system 16 resulting from establishment of both the first power transmission path PT1 and the second power transmission path PT2 is avoided. The predetermined hydraulic pressure α, for example, corresponds to a hydraulic pressure obtained by subtracting the maximum pressure Psl1max (or the maximum pressure Psl2max) from a hydraulic pressure that generates thrust for urging the spool valve element SV toward the fail-safe valve position, which is balanced with the total thrust of the urging force of the spring SP, thrust that is input to the C1 pressure control valve 86 so as to urge the spool valve element SV toward the normal valve position, and the like.

Referring back to FIG. 3, the electronic control unit 90 functions as and thus includes engine output control means, that is, an engine output control unit 92, and shift control means, that is, a shift control unit 94.

The engine output control unit 92, for example, calculates a required driving force Fdem by applying the accelerator operation amount θacc and the vehicle speed V to a relationship (for example, a driving force map) empirically obtained or obtained by design and stored in advance (that is, predetermined). The engine output control unit 92 sets a target engine torque Tetgt by which the required driving force Fdem is obtained, and outputs, to a throttle actuator, a fuel injection device, an ignition device, and the like, the engine output control command signal Se for output control over the engine 12 such that the target engine torque Tetgt is obtained.

During a stop of the vehicle, the shift control unit 94 outputs, to the hydraulic control circuit 80, a command to operate the hydraulic actuator 62 to engage the dog clutch D1 in preparation for the gear drive mode. After that, at the time when the shift lever is shifted into the forward drive position D (or the reverse drive position R), the shift control unit 94 outputs, to the hydraulic control circuit 80, a command to engage the first clutch C1 (or the first brake B1).

In the CVT drive mode, for example, the shift control unit 94 determines a hydraulic pressure command (hydraulic control command signal Scvt) of each of the primary pressure Pin and the secondary pressure Pout by applying the accelerator operation amount θacc, the vehicle speed V, and the like, to a predetermined relationship (for example, a CVT shift map, a belt clamping force map). The hydraulic pressure commands are intended to achieve a target speed ratio γtgt of the continuously variable transmission 24 while a belt slip of the continuously variable transmission 24 does not occur. The target speed ratio γtgt is set such that the operating point of the engine 12 is on a predetermined optimal line (for example, an engine optimal fuel consumption line). The shift control unit 94 outputs those hydraulic pressure commands to the hydraulic control circuit 80, and carries out a CVT shift.

The shift control unit 94 controls a change of the driving pattern between the gear drive mode and the CVT drive mode. Specifically, for example, the shift control unit 94 determines whether to change the speed ratio γ by applying the vehicle speed V and the accelerator operation amount θacc to an upshift line and a downshift line with a predetermined hysteresis for changing the speed ratio γ between the speed ratio EL in the gear drive mode and the lowest speed ratio γmax in the CVT drive mode, and changes the driving pattern on the basis of the determined result.

When the shift control unit 94 determines to upshift in the gear drive mode and changes the driving pattern from the gear drive mode to the CVT drive mode (intermediate vehicle speed), the shift control unit 94 carries out a CtoC shift. Thus, the power transmission path PT in the power transmission system 16 is changed from the first power transmission path PT1 to the second power transmission path PT2. When the shift control unit 94 changes the driving pattern from the CVT drive mode (intermediate vehicle speed) to the CVT drive mode (high vehicle speed), the shift control unit 94 outputs, to the hydraulic control circuit 80, a command to operate the hydraulic actuator 62 to release the dog clutch D1. When the shift control unit 94 changes the driving pattern from the CVT drive mode (high vehicle speed) to the CVT drive mode (intermediate vehicle speed), the shift control unit 94 outputs, to the hydraulic control circuit 80, a command to operate the hydraulic actuator 62 to engage the dog clutch D1. When the shift control unit 94 determines to downshift in the CVT drive mode (intermediate vehicle speed) and changes the driving pattern to the gear drive mode, the shift control unit 94 carries out a CtoC shift. Thus, the power transmission path PT in the power transmission system 16 is changed from the second power transmission path PT2 to the first power transmission path PT1. In change control for changing the driving pattern between the gear drive mode and the CVT drive mode, the change is carried out via the CVT drive mode (intermediate vehicle speed), so the first power transmission path PT1 and the second power transmission path PT2 are changed only by exchanging torque through a CtoC shift. Therefore, a change shock is suppressed.

Incidentally, if the C1 pressure control valve 86 does not operate normally during traveling because of a failure, such as a stuck failure, there is a concern that a tie-up of the power transmission system 16 occurs at the time of a failure of the C1 electromagnetic valve SL1 or the C2 electromagnetic valve SL2. Therefore, in the present embodiment, in the CVT drive mode in which the second clutch C2 is engaged, the SL1 pressure Psl1 for further engaging the first clutch C1 is supplied, and then it is determined whether the C1 pressure Pc1 is normally interrupted (whether the first clutch C1 remains released). Thus, it is determined whether the C1 pressure control valve 86 normally operates. However, if the C1 pressure control valve 86 already has a failure, there is a concern that a tie-up of the power transmission system 16 occurs. During a stop of the vehicle when rotation of the output shaft 30 is stopped, even when it is determined whether the C1 pressure control valve 86 has a failure by supplying the SL1 pressure Psl1 and the SL2 pressure Psl2 for engaging the first clutch C1 and the second clutch C2, the above-described inconvenience does not arise.

During traveling using the second power transmission path PT2 established by engaging the second clutch C2 in a state where the dog clutch D1 is released (that is, in the CVT drive mode (high vehicle speed)), the electronic control unit 90 outputs a hydraulic pressure command for engaging the first clutch C1, and, when the first clutch C1 is engaged in response to the hydraulic pressure command, prohibits traveling using the first power transmission path PT1 (that is, the gear drive mode). When the electronic control unit 90 prohibits the gear drive mode, the electronic control unit 90 causes the vehicle to travel by the use of the second power transmission path PT2 (that is, in the CVT drive mode (high vehicle speed)). When it is determined whether the C1 pressure control valve 86 has a failure in the CVT drive mode (high vehicle speed), the first power transmission path PT1 is not established even when the C1 pressure control valve 86 already has a failure (because the dog clutch D1 is released), so a tie-up of the power transmission system 16 does not occur.

Figure 7:
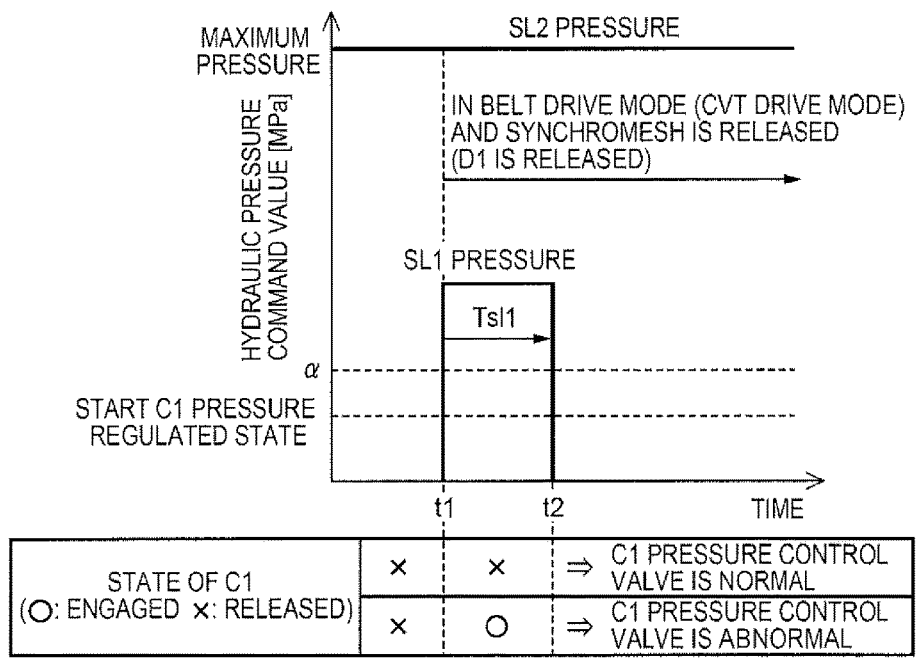
FIG. 7 is a view that shows an example of a hydraulic pressure command value of an SL1 pressure, which is a hydraulic pressure command for engaging the first clutch and which is output at the time of determining whether the C1 pressure control valve has a failure.

FIG. 7 is a view that shows an example of a hydraulic pressure command value of the SL1 pressure Psl1, which is a hydraulic pressure command for engaging the first clutch C1 and which is output at the time of determining whether the C1 pressure control valve 86 has a failure. In FIG. 7, during a period from time t1 at which the driving pattern becomes the CVT drive mode (high vehicle speed) in which the hydraulic pressure command value of the SL2 pressure Psl2 is the maximum pressure Psl2max to time t2 at which a predetermined time Tsl1 elapses, the hydraulic pressure command value of the SL1 pressure Psl1, which exceeds the predetermined hydraulic pressure α, is output. When the first clutch C1 is released during the predetermined time Tsl1 (for example, at time t2), the C1 pressure control valve 86 is normal. On the other hand, when the first clutch C1 is engaged during the predetermined time Tsl1, the C1 pressure control valve 86 has a failure (abnormal). The predetermined time Tsl1 and the hydraulic pressure command value of the SL1 pressure Psl1 during failure determination are, for example, determined in advance in consideration of the response of the actual SL1 pressure Psl1 to the output of the hydraulic pressure command value and individual differences.

Figure 8:
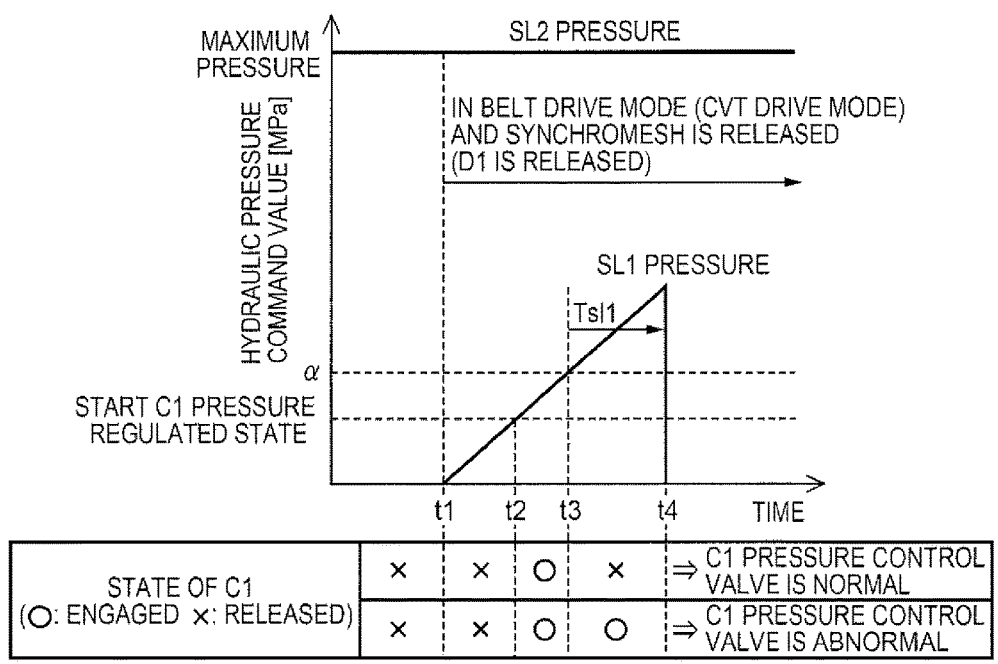
FIG. 8 is a view that shows an example of a hydraulic pressure command value of the SL1 pressure, which is a hydraulic pressure command for engaging the first clutch and which is output at the time of determining whether the C1 pressure control valve has a failure, and is an example different from FIG. 7.

FIG. 8 is a view that shows a hydraulic pressure command value of the SL1 pressure Psl1, which is a hydraulic pressure command for engaging the first clutch C1 and which is output at the time of determining whether the C1 pressure control valve 86 has a failure, and is an example different from FIG. 7. In FIG. 8, from time t1 at which the driving pattern becomes the CVT drive mode (high vehicle speed) in which the hydraulic pressure command value of the SL2 pressure Psl2 is the maximum pressure Psl2max, the hydraulic pressure command value that gradually increases toward the SL1 pressure Psl1 exceeding the predetermined hydraulic pressure α is output. This gradual increase in the hydraulic pressure command value is continued from time t3 at which the hydraulic pressure command value exceeds the predetermined hydraulic pressure α to time t4 at which the predetermined time Tsl1 elapses. During the predetermined time Tsl1 in which the hydraulic pressure command value exceeds the predetermined hydraulic pressure α, when the first clutch C1 is released, the C1 pressure control valve 86 is normal. On the other hand, during the predetermined time Tsl1, when the first clutch C1 is engaged, the C1 pressure control valve 86 has a failure (abnormal). The predetermined time Tsl1 and the hydraulic pressure command value of the SL1 pressure Psl1 during failure determination are, for example, determined in advance in consideration of the response of the actual SL1 pressure Psl1 to the output of the hydraulic pressure command value and individual differences. Because the C1 pressure control valve 86 is not switched to the fail-safe valve position (Failsafe) until the SL1 pressure Psl1 exceeds the predetermined hydraulic pressure α, the C1 pressure Pc1 is supplied to the first clutch C1 before time t3. Therefore, from time t2 to time t3, during which pressure regulation of the first clutch C1 is started and the hydraulic pressure command value of the SL1 pressure Psl1 corresponding to the C1 pressure Pc1 is output, the first clutch C1 is engaged irrespective of whether the C1 pressure control valve 86 has a failure.

Figure 9:
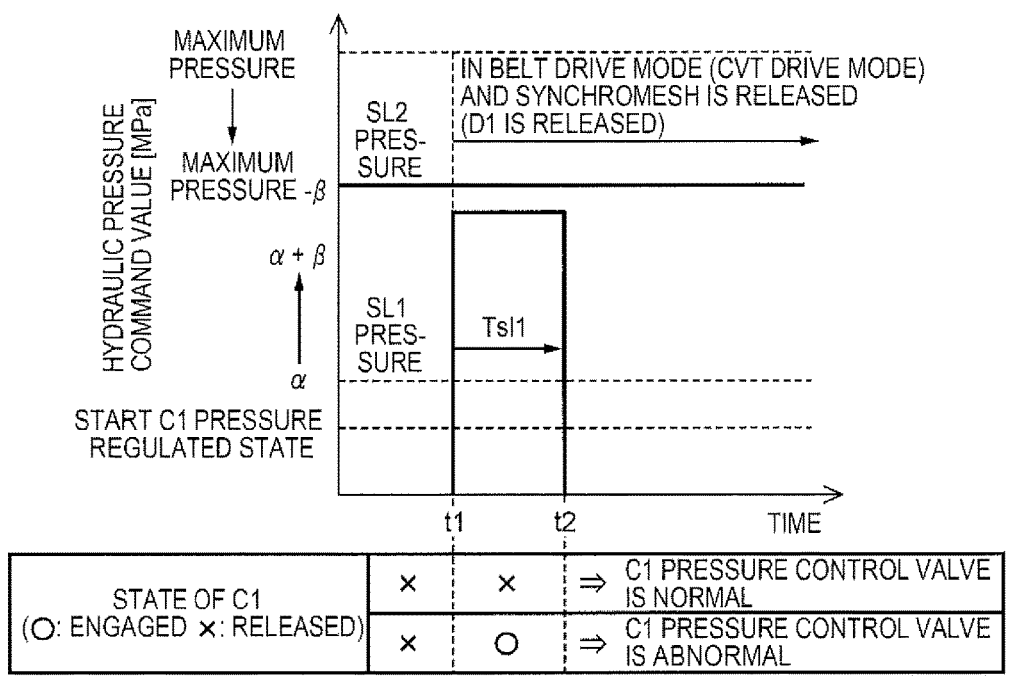
FIG. 9 is a view that shows an example of a hydraulic pressure command value of the SL1 pressure, which is a hydraulic pressure command for engaging the first clutch and which is output at the time of determining whether the C1 pressure control valve has a failure, and is an example different from FIG. 7.

FIG. 9 is a view that shows a hydraulic pressure command value of the SL1 pressure Psl1, which is a hydraulic pressure command for engaging the first clutch C1 and which is output at the time of determining whether the C1 pressure control valve 86 has a failure, and is an example different from FIG. 7. The embodiment shown in FIG. 9 is an example in which the hydraulic pressure command value is set to a value obtained by subtracting a hydraulic pressure β from the maximum pressure Psl2max because of a load and pressure decrease of the oil pump 42. That is, when the actual SL2 pressure Psl2 is a value obtained by subtracting the hydraulic pressure β from the maximum pressure Psl2max even by setting the hydraulic pressure command value to the maximum pressure Psl2max, the hydraulic pressure command value is a value obtained by subtracting the hydraulic pressure β from the maximum pressure Psl2max. In this case, the predetermined hydraulic pressure α is replaced with a predetermined hydraulic pressure (α+β). When the total hydraulic pressure of the SL1 pressure Psl1 and the SL2 pressure Psl2 exceeds the total hydraulic pressure of the maximum pressure Psl1max (or the maximum pressure Psl2max) and the predetermined hydraulic pressure α, the C1 pressure control valve 86 is switched to the fail-safe valve position (Failsafe). Therefore, when the actual SL2 pressure Psl2 is a value obtained by subtracting the hydraulic pressure β from the maximum pressure Psl2max, the predetermined hydraulic pressure α needs to be replaced with the predetermined hydraulic pressure (α+β) in order to switch to the fail-safe valve position (Failsafe). Therefore, in FIG. 9, during a period from time t1 at which the driving pattern becomes the CVT drive mode (high vehicle speed) to time t2 at which the predetermined time Tsl1 elapses, the hydraulic pressure command value of the SL1 pressure Psl1, which exceeds the predetermined hydraulic pressure (α+β), is output. The hydraulic pressure β is, for example, set in accordance with a predetermined procedure in consideration of driving states of the primary electromagnetic valve SLP and secondary electromagnetic valve SLS that are actuated by using working hydraulic pressure that is generated by the oil pump 42 as a source pressure. Thus, by outputting the hydraulic pressure command value of the SL1 pressure Psl1 on the basis of the predetermined hydraulic pressure (α+β) commensurate with the SL2 pressure Psl2, it is possible to determine whether the C1 pressure control valve 86 has a failure at the appropriate SL1 pressure Psl1. When the actual SL2 pressure Psl2 is a value obtained by subtracting the hydraulic pressure β from the maximum pressure Psl2max even by setting the hydraulic pressure command value to the maximum pressure Psl2max, the predetermined hydraulic pressure α may be replaced with the predetermined hydraulic pressure (α+β) while the hydraulic pressure command value is kept at the maximum pressure Psl2max in the embodiment of FIG. 9.

More specifically, referring back to FIG. 3, the electronic control unit 90 further functions as and thus includes vehicle state determination means, that is, a vehicle state determination unit 96, and failure determination means, that is, a failure determination unit 98.

The vehicle state determination unit 96 determines whether the driving pattern is the CVT drive mode (belt drive mode) on the basis of, for example, whether the hydraulic pressure command value of the SL2 pressure Psl2 is output to the C2 electromagnetic valve SL2 for engaging the second clutch C2 in a state where the vehicle speed V is higher than or equal to a predetermined vehicle speed that indicates that the vehicle is traveling.

The vehicle state determination unit 96, for example, determines whether the dog clutch D1 (the synchromesh mechanism S1) is in the released state on the basis of the synchromesh position Psync. For example, the vehicle state determination unit 96 determines that the dog clutch D1 is in the engaged state when the synchromesh position Psync falls within a predetermined range; whereas the vehicle state determination unit 96 determines that the dog clutch D1 is in a non-engaged state (that is, the released state) when the synchromesh position Psync falls outside the predetermined range. The predetermined range is, for example, a predetermined range of the synchromesh position Psync for allowing to determine that the sleeve 58 has moved to the synchromesh position Psync in which the dog clutch D1 is in the engaged state.

When the vehicle state determination unit 96 determines that the driving pattern is the CVT drive mode and the dog clutch D1 is in the released state, the failure determination unit 98 outputs the hydraulic pressure command value of the SL1 pressure Psl1 for engaging the first clutch C1. The hydraulic pressure command value of the SL1 pressure Psl1 is, for example, the hydraulic pressure command value shown in FIG. 7, FIG. 8 or FIG. 9.

The failure determination unit 98 determines whether the first clutch C1 is engaged on the basis of whether a rotation difference $\Delta N(=Nin-Nsun)$ between the input shaft rotation speed Nin and the sun gear rotation speed Nsun, as an input/output rotation difference of the first clutch C1, falls within a predetermined rotation difference while the hydraulic pressure command value of the SL1 pressure Psl1 is output. The predetermined rotation speed is, for example, a predetermined determination threshold for allowing to determine that the input shaft rotation speed Nin and the sun gear rotation speed Nsun are synchronous with each other, and is more specifically zero or a value that is substantially zero.

The failure determination unit 98 determines whether the C1 pressure control valve 86 has a failure (that is, the C1 pressure control valve 86 is abnormal) on the basis of whether the first clutch C1 is engaged while the hydraulic pressure command value of the SL1 pressure Psl1 is output. The failure determination unit 98 determines that the C1 pressure control valve 86 is abnormal when the failure determination unit 98 determines that the first clutch C1 is engaged; whereas the failure determination unit 98 determines that the C1 pressure control valve 86 is normal when the failure determination unit 98 determines that the first clutch C1 is not engaged.

When the failure determination unit 98 determines that the C1 pressure control valve 86 is abnormal in the CVT drive mode (high vehicle speed), the shift control unit 94 prohibits the gear drive mode. Therefore, the shift control unit 94 continues the CVT drive mode (high vehicle speed) even in a vehicle state where the vehicle speed V decreases in the CVT drive mode (high vehicle speed) and the gear drive mode should be set, and the shift control unit 94 does not change the driving pattern to the gear drive mode. When it is determined that the C1 pressure control valve 86 is abnormal, the shift control unit 94 does not change the driving pattern to the gear drive mode, so the shift control unit 94 also does not change the driving pattern to the CVT drive mode (intermediate vehicle speed) via which the driving pattern is changed to the gear drive mode. When it is determined that the C1 pressure control valve 86 is abnormal, the shift control unit 94 sets the driving pattern to the CVT drive mode (high vehicle speed) even when the vehicle starts moving. In this way, when it is determined that the C1 pressure control valve 86 is abnormal, the shift control unit 94 keeps the driving pattern of the CVT drive mode (high vehicle speed). Thus, a tie-up of the power transmission system 16 due to a failure of the C1 pressure control valve 86 is prevented, and retreat traveling is allowed.

Figure 10:
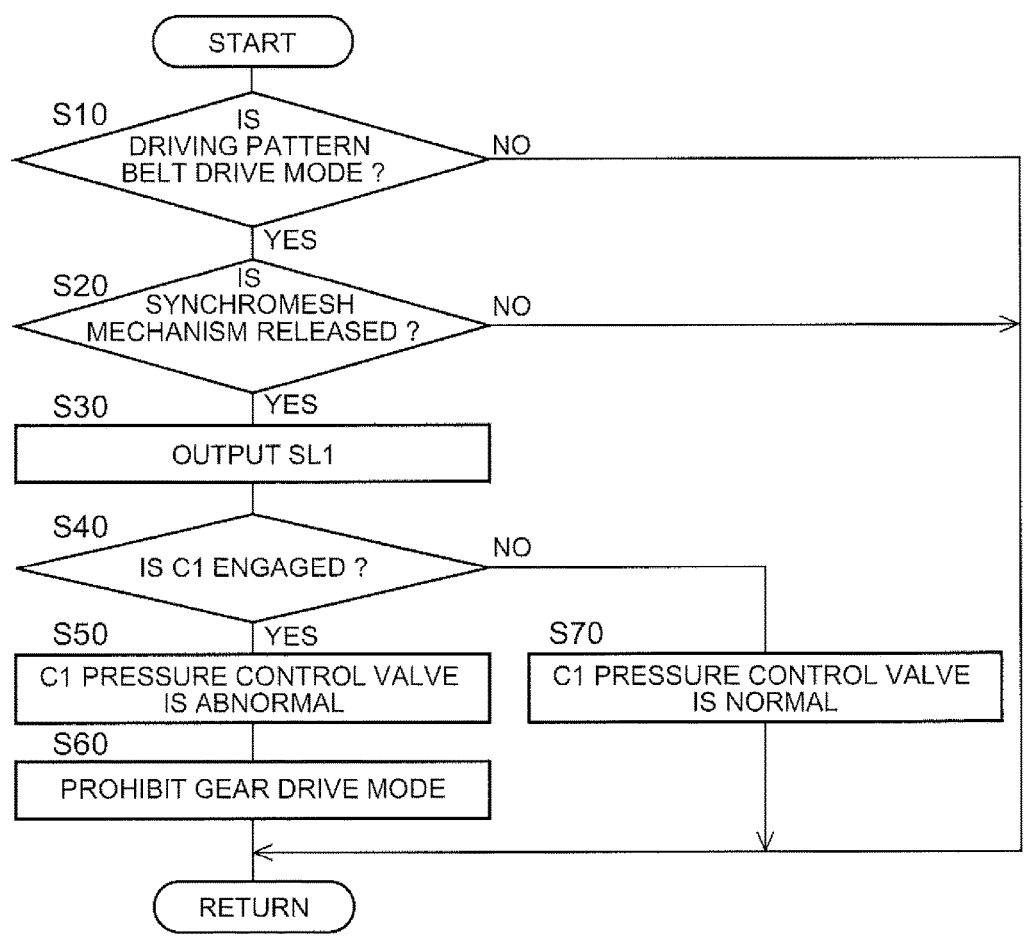
FIG. 10 is a flowchart that illustrates a relevant portion of control operations of an electronic control unit, that is, control operations for detecting a failure of the C1 pressure control valve during traveling while preventing occurrence of a tie-up of the power transmission system.

FIG. 10 is a flowchart that illustrates a relevant portion of control operations of the electronic control unit 90, that is, control operations for detecting a failure of the C1 pressure control valve 86 while preventing occurrence of a tie-up of the power transmission system 16. The flowchart is, for example, repeatedly executed at various timings, such as intervals of one trip from turning-on of an ignition to turning-off of the ignition and intervals of one event from a start of the vehicle to a stop of the vehicle.

In FIG. 10, initially, in step (hereinafter, step is omitted) S10 corresponding to the functions performed by the vehicle state determination unit 96, it is determined whether the driving pattern is the CVT drive mode (belt drive mode). When negative determination is made in S10, the routine is ended. When affirmative determination is made in S10, it is determined, in S20 corresponding to the functions performed by the vehicle state determination unit 96, whether the dog clutch D1 (synchromesh mechanism S1) is in the released state. When negative determination is made in S20, the routine is ended. When affirmative determination is made in S20, the hydraulic pressure command value of the SL1 pressure Psl1 for engaging the first clutch C1 is output in S30 corresponding to the functions performed by the failure determination unit 98. Subsequently, in S40, corresponding to the functions performed by the failure determination unit 98, it is determined whether the first clutch C1 is engaged. When affirmative determination is made in S40, it is determined in S50, corresponding to the functions performed by the failure determination unit 98, that the C1 pressure control valve 86 is abnormal. Subsequently, in S60, corresponding to the functions performed by the shift control unit 94, the gear drive mode is prohibited. On the other hand, when negative determination is made in S40, it is determined in S70, corresponding to the functions performed by the failure determination unit 98, that the C1 pressure control valve 86 is normal.

As described above, according to the present embodiment, in a state where the dog clutch D1 is released in the CVT drive mode using the second power transmission path PT2 in which the dog clutch D1 is not interposed, by outputting the hydraulic pressure command for engaging the first clutch C1 and then determining whether the first clutch C1 is engaged, it is possible to determine whether the C1 pressure control valve 86 that serves as a fail-safe valve has a failure or is operating normally. At this time, because the dog clutch D1 is released, a tie-up of the power transmission system 16 does not occur even when the first clutch C1 is engaged. When it is determined that the C1 pressure control valve 86 has a failure, the gear drive mode that uses the first power transmission path PT1, which causes a tie-up in the event of such a failure that the second clutch C2 is engaged, is prohibited. Thus, it is possible to detect a failure of the C1 pressure control valve 86 during traveling while preventing occurrence of a tie-up of the power transmission system 16.

In this way, according to the present embodiment, it is possible to detect that the C1 pressure control valve 86 does not operate normally. On the contrary, when the C1 pressure control valve 86 is operating abnormally from the beginning (that is, when the C1 pressure control valve 86 is stuck at the fail-safe valve position side), it is not possible to engage the first clutch C1 and set the driving pattern to the gear drive mode (that is, it is not possible to establish the first power transmission path PT1) at the time of a stop of the vehicle. With this phenomenon, it is possible to determine that the C1 pressure control valve 86 is abnormal, that is, the C1 pressure control valve 86 is stuck at the fail-safe valve position side, at the start of the vehicle. Therefore, it is possible to perform the CVT drive mode while avoiding occurrence of a tie-up of the power transmission system 16 and detecting abnormal operation of the C1 pressure control valve 86. As a result, in combination with the embodiment, it is possible to easily determine both the situation that the C1 pressure control valve 86 does not normally operate and the abnormal operation of the C1 pressure control valve 86, and it is possible to carry out retreat traveling in appropriate driving pattern.

Next, another embodiment will be described. In the following description, like reference numerals denote portions common to the embodiments, and the description thereof is omitted.

Figure 11:
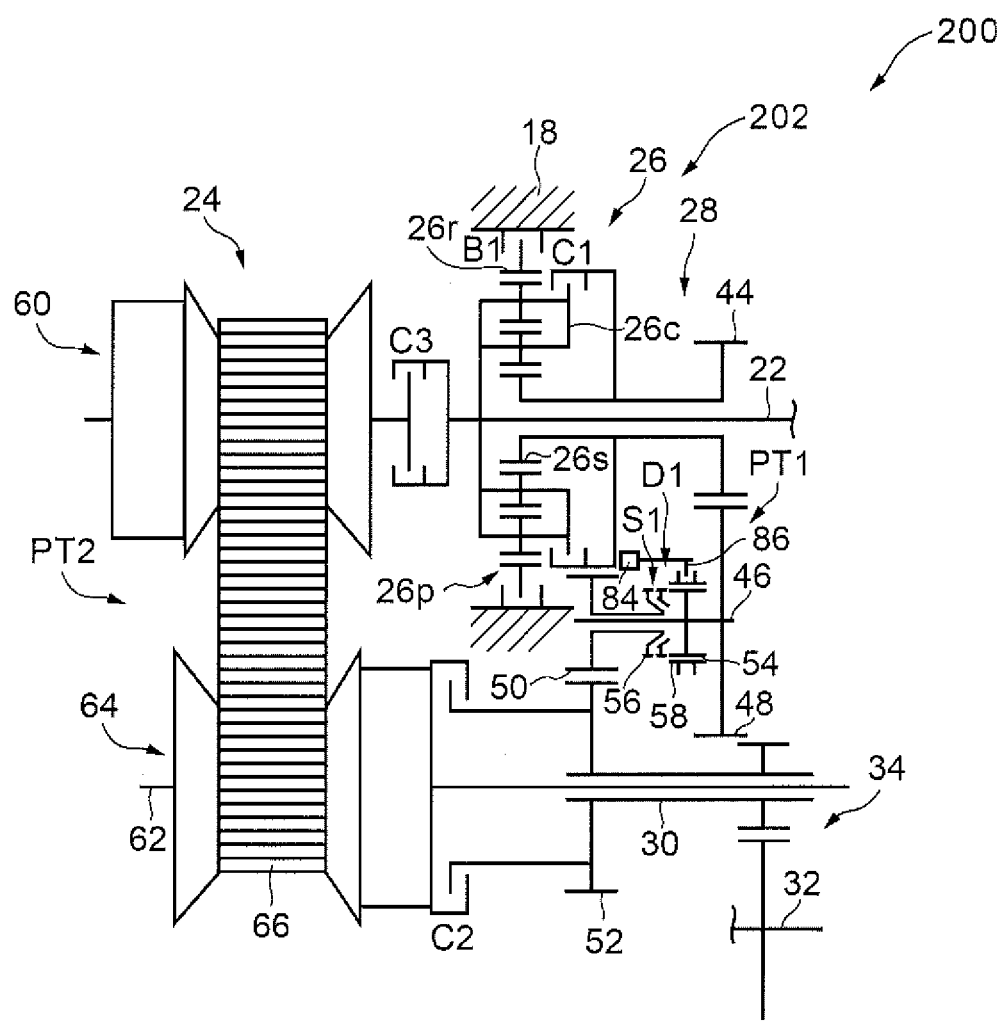
FIG. 11 is a view that illustrates the schematic configuration of a vehicle to which embodiments are applied, and is an example different from FIG. 1.
Figure 12:
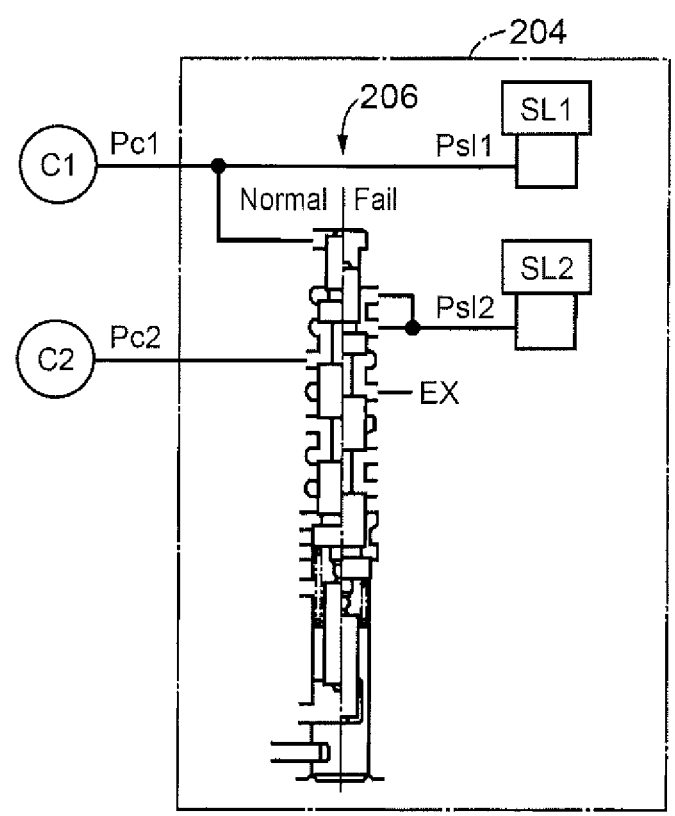
FIG. 12 is a view that illustrates the configuration of a C2 pressure control valve.

FIG. 11 is a view that illustrates the schematic configuration of a vehicle 200 according to another embodiment. In FIG. 11, a power transmission system 202 of the vehicle 200 differs from the power transmission system 16 according to the above-described first embodiment in that a third clutch C3 is further provided on the input shaft 22 side with respect to the continuously variable transmission 24. The third clutch C3 is a known hydraulic friction engagement device (friction clutch) that is frictionally engaged by a hydraulic actuator. The third clutch C3 corresponds to a third friction clutch. The third clutch C3 is provided on a rotary member side different from a side on which the second clutch C2 is provided with respect to the continuously variable transmission 24, and connects or interrupts the second power transmission path PT2. In the above-described first embodiment, the dog clutch D1 functions as the third engagement device. In the present embodiment, instead of the dog clutch D1, the third clutch C3 functions as the third engagement device. Therefore, in the above-described first embodiment, the hydraulic control circuit 80 provided in the power transmission system 16 includes the C1 pressure control valve 86 as a fail-safe valve. In the present embodiment, as shown in FIG. 12, a hydraulic control circuit 204 provided in the power transmission system 202 includes a C2 pressure control valve 206 as a fail-safe valve instead of the C1 pressure control valve 86. The C2 pressure control valve 206 avoids simultaneous engagement of the second clutch C2 and the first clutch C1 by interrupting the oil passage that supplies the C2 pressure Pc2 (which is synonymous with the SL2 pressure Psl2) to the second clutch C2.

As shown in FIG. 12, the C2 pressure control valve 206 differs from the C1 pressure control valve 86 in that the SL2 pressure Psl2 is input to the port to which the SL1 pressure Psl1 is input in the C1 pressure control valve 86, the SL1 pressure Psl1 is input to the port to which the SL2 pressure Psl2 is input in the C1 pressure control valve 86, and the C2 pressure Pc2 is output from the port from which the C1 pressure Pc1 is output in the C1 pressure control valve 86. The thus configured C2 pressure control valve 206 switches between a communication state and interrupted state of the oil passage that supplies the SL2 pressure Psl2 to the second clutch C2 as the C2 pressure Pc2. The SL1 pressure Psl1 that is output from the C1 electromagnetic valve SL1 is directly supplied to the first clutch C1 as the C1 pressure Pc1.

During traveling using the first power transmission path PT1 established by engaging the first clutch C1 in a state where the third clutch C3 is released (that is, in the gear drive mode), the electronic control unit 90 outputs a hydraulic pressure command for engaging the second clutch C2, and, when the second clutch C2 is engaged in response to the hydraulic pressure command, prohibits traveling using the second power transmission path PT2 (that is, the CVT drive mode). When the electronic control unit 90 prohibits the CVT drive mode, the electronic control unit 90 causes the vehicle to travel by using the first power transmission path PT1 (that is, the gear drive mode). By determining whether the C2 pressure control valve 206 has a failure in the gear drive mode, the second power transmission path PT2 is not established even when the C2 pressure control valve 206 already has a failure, so a tie-up of the power transmission system 202 does not occur.

In the present embodiment, as well as the flowchart of FIG. 10 in the above-described first embodiment, control operations are executed. In the present embodiment, "IS DRIVING PATTERN BELT DRIVE MODE?" in S10 of FIG. 10 is replaced with "IS DRIVING PATTERN GEAR DRIVE MODE?", "IS SYNCHROMESH MECHANISM RELEASED?" in S20 of FIG. 10 is replaced with "IS THIRD CLUTCH C3 RELEASED?", "OUTPUT SL1" in S30 of FIG. 10 is replaced with "OUTPUT SL2", "IS C1 ENGAGED?" in S40 of FIG. 10 is replaced with "IS C2 ENGAGED?", "C1 PRESSURE CONTROL VALVE IS ABNORMAL" in S50 of FIG. 10 is replaced with "C2 PRESSURE CONTROL VALVE IS ABNORMAL", "PROHIBIT GEAR DRIVE MODE" in S60 of FIG. 10 is replaced with "PROHIBIT BELT DRIVE MODE", and "C1 PRESSURE CONTROL VALVE IS NORMAL" in S70 of FIG. 10 is replaced with "C2 PRESSURE CONTROL VALVE IS NORMAL".

As described above, according to the present embodiment, in a state where the third clutch C3 is released in the gear drive mode using the first power transmission path PT1 in which the third clutch C3 is not interposed, by outputting the hydraulic pressure command for engaging the second clutch C2 and then determining whether the second clutch C2 is engaged, it is possible to determine whether the C2 pressure control valve 206 that serves as a fail-safe valve has a failure or is operating normally. At this time, because the third clutch C3 is released, a tie-up of the power transmission system 202 does not occur even when the second clutch C2 is engaged. When it is determined that the C2 pressure control valve 206 has a failure, the CVT drive mode that uses the second power transmission path PT2, which causes a tie-up in the event of such a failure that the first clutch C1 is engaged, is prohibited. Thus, it is possible to detect a failure of the C2 pressure control valve 206 during traveling while preventing occurrence of a tie-up of the power transmission system 202.

The embodiments are described in detail with reference to the drawings; however, alternative embodiments are possible.

For example, as described in the first and second embodiments, hydraulic pressure commands for simultaneous engagement of the first engagement device (first clutch C1) and the second engagement device (second clutch C2) are output during traveling in a state where the third engagement device (dog clutch D1 or third clutch C3) is released, and, when both the first engagement device and the second engagement device are engaged in response to the hydraulic pressure commands, traveling using the power transmission path established by engaging the third engagement device is prohibited. When traveling using the power transmission path established by engaging the third engagement device is prohibited, the vehicle travels by using the other power transmission path not established by engaging the third engagement device. Thus, it is possible to detect a failure of the fail-safe valve (C1 pressure control valve 86 or C2 pressure control valve 206) during traveling while preventing occurrence of a tie-up of the power transmission system 16 or power transmission system 202. For a temporary stuck failure (non-operation state) of the fail-safe valve, it is possible to cancel prohibition of traveling using the power transmission path established by engaging the third engagement device at the time when it is determined that the fail-safe valve operates normally.

In the above-described first embodiment, when it is determined that the C1 pressure control valve 86 is abnormal in the CVT drive mode (high vehicle speed) and then the gear drive mode is prohibited, the driving pattern of the CVT drive mode (high vehicle speed) is kept without changing the driving pattern to the CVT drive mode (intermediate vehicle speed); however, the configuration is not limited to this embodiment. For example, considering the frequency of occurrence (probability of occurrence) of double failure that a failure of the C1 pressure control valve 86 and a failure that the C1 pressure Pc1 for engaging the first clutch C1 is supplied to the first clutch C1 because of the abnormal C1 electromagnetic valve SL1 overlap with each other, the following embodiment is applicable. The driving pattern is switched in advance to the CVT drive mode (intermediate vehicle speed) that is a state where the dog clutch D1 is engaged such that a reverse traveling power transmission path is quickly established only by engaging the first brake B1 without engaging the dog clutch D1 at the time of shift lever operation to a reverse traveling operating position R after a stop of the vehicle (or just before a stop of the vehicle). When such an embodiment is employed, the driving pattern of the CVT drive mode (high vehicle speed) may be kept in a high vehicle speed range, and the driving pattern of the CVT drive mode (intermediate vehicle speed) may be kept in a low and intermediate vehicle speed range. Instead, the driving pattern may be changed from the CVT drive mode (high vehicle speed) to the CVT drive mode (intermediate vehicle speed) only in a low vehicle speed range (or a traveling state where a stop of the vehicle is expected) in which there is a possibility that the reverse traveling power transmission path is established.

In the above-described first embodiment, it is determined whether the first clutch C1 is engaged on the basis of whether the input/output rotation difference of the first clutch C1 falls within the predetermined rotation difference; however, the configurations are not limited to this embodiment. For example, a hydraulic pressure switch or hydraulic pressure sensor that detects the C1 pressure Pc1 that is input to the first clutch C1 may be provided, and it may be determined whether the first clutch C1 is engaged on the basis of whether the C1 pressure Pc1 detected by the hydraulic pressure switch or hydraulic pressure sensor is higher than or equal to a hydraulic pressure by which the first clutch C1 is engaged. Determination as to whether the second clutch C2 is engaged is also carried out similarly to determination as to whether the first clutch C1 is engaged.

In the above-described first embodiment, the second clutch C2 may be provided on the input shaft 22 side with respect to the continuously variable transmission 24. In the above-described second embodiment, the second clutch C2 may be provided on the input shaft 22 side with respect to the continuously variable transmission 24, and the third clutch C3 may be provided on the output shaft 30 side with respect to the continuously variable transmission 24.

In the above-described embodiments, the gear transmission mechanism 28 is the gear transmission mechanism that establishes one speed stage having a speed ratio lower than the maximum speed ratio $\gamma$max of the continuously variable transmission 24; however, the gear transmission mechanism 28 is not limited to this configuration. For example, the gear transmission mechanism 28 may be a gear transmission mechanism in which a plurality of speed stages having different speed ratios $\gamma$ are established. That is, the gear transmission mechanism 28 may be a stepped transmission that is shifted into two or more stages. For example, the gear transmission mechanism 28 may be a gear transmission mechanism that establishes a speed ratio higher than the minimum speed ratio $\gamma$min of the continuously variable transmission 24 and a speed ratio lower than the maximum speed ratio $\gamma$max.

In the above-described embodiments, the power transmission system 16 or power transmission system 202 includes the first power transmission path PT1 through the gear transmission mechanism 28 and the second power transmission path PT2 through the continuously variable transmission 24; however, the embodiments are not limited to this configuration. For example, the continuously variable transmission 24 may be a gear transmission mechanism having a plurality of speed stages with different speed ratios. The power transmission system 16 or power transmission system 202 may include another power transmission path PT in addition to the first power transmission path PT1 and the second power transmission path PT2.

In the above-described embodiments, the driving pattern of the power transmission system 16 or power transmission system 202 is changed by using the predetermined shift map; however, the embodiments are not limited to this configuration. For example, the driving pattern of the power transmission system 16 or power transmission system 202 may be changed by calculating a driver's driving request amount (for example, required torque) on the basis of the vehicle speed V and the accelerator operation amount θacc and then setting a speed ratio that satisfies the required torque.

In the above-described embodiment, the engine 12 is illustrated as the driving force source; however, the embodiments are not limited to this configuration. For example, another prime mover, such as an electric motor, may be employed solely or in combination with the engine 12 as the driving force source. The embodiments are not limited to configurations in which the power of the engine 12 is transmitted to the input shaft 22 via the torque converter 20. For example, instead of the torque converter 20, another fluid transmission device, such as a fluid coupling having no torque amplification function, may be used. Alternatively, the fluid transmission device is not necessarily provided. The dog clutch D1 includes the synchromesh mechanism S1; however, the synchromesh mechanism S1 does not need to be provided.

The above-described embodiments are only illustrative, and the teachings of the present disclosure may be implemented in modes including various modifications or improvements on the basis of the knowledge of persons skilled in the art.

What is claimed is:

1. A power transmission system configured to transmit power between an input rotating member to which power of a driving force source is transmitted and an output rotating member that outputs the power to a drive wheel of a vehicle, the power transmission system comprising:
    a first transmission provided in a first power transmission path between the input rotating member and the output rotating member;
    a second transmission provided in parallel with the first transmission and in a second power transmission path between the input rotating member and the output rotating member;
    a first engagement device configured to selectively connect or interrupt the first power transmission path that transmits power of the driving force source to the drive wheel via the first transmission;

a second engagement device configured to selectively connect or interrupt the second power transmission path that transmits power of the driving force source to the drive wheel via the second transmission;

a third engagement device configured to selectively connect or interrupt one of the first power transmission path and the second power transmission path;

a fail-safe valve configured to interrupt one of a first oil passage that supplies hydraulic pressure to the first engagement device and a second oil passage that supplies hydraulic pressure to the second engagement device, such that simultaneous engagement of the first engagement device and the second engagement device is avoided; and an electronic control unit configured to, during traveling of the vehicle in a state where the third engagement device is released, (i) output hydraulic pressure commands for simultaneous engagement of the first engagement device and the second engagement device, (ii) determine whether both the first engagement device and the second engagement device are engaged at a time when the hydraulic pressure commands are being simultaneously output, and (iii) when it is determined that both the first engagement device and the second engagement device are engaged, prohibit traveling using the one of the first power transmission path and the second power transmission path which is selectively connected or interrupted by the third engagement device.

2. The power transmission system according to claim 1, wherein the first transmission is a gear transmission, the second transmission is a continuously variable transmission, the first engagement device is a first friction clutch, the second engagement device is a second friction clutch, the third engagement device is a dog clutch that is provided on the output rotating member side with respect to the first friction clutch and that selectively connects or interrupts the first power transmission path, and the fail-safe valve is configured to interrupt the first oil passage such that the simultaneous engagement is avoided, the electronic control unit is configured to, during traveling using the second power transmission path established by engaging the second friction clutch in a state where the dog clutch is released, (i) output a hydraulic pressure command for engaging the first friction clutch, (ii) determine whether both the first friction clutch and the second friction clutch are engaged in response to the hydraulic pressure command, and (iii) when it is determined that both the first friction clutch and the second friction clutch are engaged, prohibit traveling using the first power transmission path.

3. The power transmission system according to claim 1, wherein the first transmission is a gear transmission, the second transmission is a continuously variable transmission, the first engagement device is a first friction clutch, the second engagement device is a second friction clutch provided on the input rotating member side or the output rotating member side with respect to the continuously variable transmission, the third engagement device is a third friction clutch that is provided on a rotating member side of the continuously variable transmission different from a side on which the second friction clutch is provided and that selectively connects or interrupts the second power transmission path, the fail-safe valve is configured to interrupt the second oil passage such that the simultaneous engagement is avoided, and the electronic control unit is configured to, during traveling using the first power transmission path established by engaging the first friction clutch in a state where the third friction clutch is released, (i) output a hydraulic pressure command for engaging the second friction clutch, (ii) determine whether both the first friction clutch and the second friction clutch are engaged in response to the hydraulic pressure command, and (iii) when it is determined that both the first friction clutch and the second friction clutch are engaged, prohibit traveling using the second power transmission path.

\* \* \* \* \*